(12) United States Patent
Jang et al.

(10) Patent No.: US 6,376,073 B1
(45) Date of Patent: Apr. 23, 2002

(54) HIGH FREQUENCY-RESISTANT THERMOSETTING COATINGS AND HIGH FREQUENCY-RESISTANT ENAMELLED WIRES PRODUCED THEREFROM

(75) Inventors: Chih-Min Jang, Taipei; Ru-Shi Liu, Hsinchu Hsien; Chi-Ting Du, Taipei; Wen-Cheng Wu, Taipei Hsien; Yung-Chin Lin; Shang-Yen Chang, both of Hsinchu; Wen-Lu Tai, Taoyuan; Yao-Chung Tu, Hsinchu; Wen-Hsiung Liu, Taipei, all of (TW)

(73) Assignee: Tai-Electric Wire & Cable Co., Ltd. (TW)

( * ) Notice: Subject to any disclaimer, the term of this patent is extended or adjusted under 35 U.S.C. 154(b) by 0 days.

(21) Appl. No.: 09/487,970

(22) Filed: Jan. 20, 2000

(30) Foreign Application Priority Data

Sep. 30, 1999 (TW) .......................... 88116837 A

(51) Int. Cl.$^7$ .............................. B32B 15/00; H01B 7/00
(52) U.S. Cl. ........................ 428/379; 428/375; 428/383; 174/110 SR; 174/120 SR
(58) Field of Search .......................... 525/424; 528/451, 528/288; 428/375, 379, 383; 174/110 SR, 120 SR

(56) References Cited

U.S. PATENT DOCUMENTS

| | | | | | |
|---|---|---|---|---|---|
| 3,988,521 A | * | 10/1976 | Shelby et al. | ................ | 428/379 |
| 4,110,297 A | * | 8/1978 | Shelby et al. | ................ | 428/379 |
| 4,218,550 A | * | 8/1980 | Pauze | .......................... | 525/437 |
| 4,240,941 A | * | 12/1980 | Jablonski et al. | ........... | 428/458 |
| 4,247,429 A | * | 1/1981 | Pauze et al. | ................. | 525/437 |
| 4,511,624 A | * | 4/1985 | Kawaguichi et al. | ........ | 428/379 |
| 4,886,848 A | * | 12/1989 | Nishiyama et al. | .......... | 524/109 |
| 4,997,891 A | * | 3/1991 | Cicero et al. | ................ | 525/424 |
| 5,219,657 A | * | 6/1993 | Ueoka et al. | ................ | 428/379 |

FOREIGN PATENT DOCUMENTS

| | | |
|---|---|---|
| JP | 534785 | 1/1978 |
| JP | 5693214 | 7/1981 |

* cited by examiner

Primary Examiner—Cynthia H. Kelly
Assistant Examiner—J. M. Gray
(74) Attorney, Agent, or Firm—Ladas & Parry

(57) ABSTRACT

A high frequency-resistant thermosetting coating is provided for the manufacture of high frequency-resistant enamelled wires. A high frequency-resistant enamelled wire produced from the high frequency-resistant thermosetting coating is also provided. The adhesion, crosslinking density, abrasion resistance, and softening resistance of the coating are excellent. With the same nominal diameter and a coating thickness more than 85 $\mu$m, the high frequency resistant lifetime of the enamelled wire produced from the high frequency-resistant thermosetting coating is 3 to 4 times as that of conventional thermoplastic enamelled wires.

6 Claims, No Drawings

HIGH FREQUENCY-RESISTANT THERMOSETTING COATINGS AND HIGH FREQUENCY-RESISTANT ENAMELLED WIRES PRODUCED THEREFROM

FIELD OF THE INVENTION

The present invention relates to a high frequency-resistant coating for enamelled wire. In particular, the present invention relates to a high frequency-resistant thermosetting coating for enamelled wire. The subject invention also relates to a enamelled wire produced from a high frequency-resistant coating. The enamelled wire is for use in switch power supply transformers or winding materials for high frequency coils.

BACKGROUND OF THE INVENTION

With the minimization of the spacing of transformers, the requirement for high frequency-resistance of power supply increases. The power supply most widely used in electrical facilities, such as switching power supply (SPS). The coating material of conventional enamelled wires needs to be further modified to meet the high requirements for high frequency-resistance. Known enamelled wires for use in a variable frequency motor for pulse-width modulation (PWM) cannot withstand long term frequency shock. JP 53-4785 discloses a crystalline thermoplastic resin for enamelled wire of insulated coating. Since the coating of the enamelled wire is thermoplastic, the mechanical properties such as surface hardness, abrasion resistance, and rubbing resistance are worse and the enamelled wire tends to be damaged during the coiling process. Hence, JP 56-93214 discloses an improvement to the above disadvantages by applying a layer of thermoplastic polyamide (for instance nylon) onto the thermoplastic resin by imparting extensibility and sliding to improve the mechanical properties during the coiling process. However, since the adhesion between the thermoplastic resin and thermoplastic polyamide is poor, three separate coatings have to be applied to increase the thickness of the coating up to 100 $\mu$m to prevent thermal cracking resulting from the high frequency impact. Furthermore, each coating is made by mixing a combination of thermoplastic materials on the basis of a fixed ratio to improve the adhesion between layers and softening resistant temperature of the coating.

Therefore, it is desirable to be able to manufacture a single coating enamelled wire with strong adhesion qualities for a low cost and without having to change the processing conditions.

SUMMARY OF THE INVENTION

The object of the present invention is to provide a thermosetting coating for high frequency-resistance.

Another object of the present invention is to provide a high frequency-resistant thermosetting coating having excellent adhesion ability.

Another object of the present invention is to provide a high frequency-resistant thermosetting coating which is not produced by multiple coatings.

Another object of the present invention is to provide a high frequency-resistant thermosetting coating which is for use in switch power supply transformers or winding materials for high frequency coils.

Another object of the present invention is to provide a high frequency-resistant thermosetting coating which is for use in the manufacture of thick enamelled wire without changing the processing conditions.

Another object of the present invention is to provide a high frequency-resistant enamelled wire produced from a high frequency-resistant thermosetting coating.

The above features and advantages of the present invention will be better understood with reference to the detailed description and examples. It should also be understood that the high frequency-resistant enamelled wire illustrating the present invention is exemplary only and not be regarded as a limitation of the invention.

DETAILED DESCRIPTION OF THE INVENTION

By way of illustration and to provide a more complete appreciation of the present invention with many of the attendant advantages thereof, the following detailed description is given concerning a high frequency-resistant thermosetting coatings and high frequency-resistant enamelled wires produced therefrom.

The present invention relates to a high frequency resistant thermosetting polyurethane (PU) coating for the manufacture of a high frequency resistant enamelled wire. The present invention also relates to a high frequency resistant enamelled wire which is produced from a high frequency resistant thermosetting polyurethane (PU) coating. When the thickness of coating is up to 85 $\mu$m, the high frequency resistant properties of the enamelled wire are outstanding.

The polyurethane used in the subject invention is obtained by mixing block diisocyanate component and esterified polyol component in an appropriate ratio.

The block diisocyanate component is produced from polymerized components comprising a diisocyanate, a methylol alkane, and a tertiary amine. The molar ratio between the diisocyanate and methylol alkane is in a range from 0.7 to 1.3:0.1 to 0.6.

The esterified polyol component is produced from components comprising a terephthalate (or terephthalic acid), an anhydride, p,p'-diaminodiphenylmethane, and at least one polyol in a molar ratio of 0.7 to 1.3:0.7 to 1.3:0.3 to 0.7:2 to 4. A catalyst such as tetrabutyl titanate can be added in an amount of 0.1 to 0.2% by weight.

The diisocyanate used are exemplified as toluene diisocyanate, methylene diisocyanate, 4,4'-diphenylmethan diisocyanate, hexylene diisocyanate, and xylyene diisocyanate. The methylol alkane is exemplified as trimethylol propane. The tertiary amine is exemplified as triethylamine.

The polyols used are exemplified as ethylene glycol, diethylene glycol, and glycerol. The molar ratio of ethylene glycol, diethylene glycol, and glycerol is about 1.0 to 1.6:1.0 to 1.6:0.2 to 0.5. The anhydride is exemplified as trimellitic anhydride. The terephthalate is exemplified as dimethyl terephthalate.

The block diisocyanate component is mixed with the polyol esterified component in a ratio of 1:1 to 1:2.5 depending on the molecular weight. The modified polyurethane thus obtained has a solid content about 40 to 46% (drying at 170° C. for 2 hours), preferably 43 to 45%, and has a viscosity of 18 to 25 poise (30° C.), preferably 23 to 25 poise (30° C.). The solvents used may be a single solvent or a mixture of solvents to dissolve the materials for facilitating coating. The amount of solvents is 54 to 60% by weight of the coating.

The high frequency resistant enamelled wire of the subject invention is produced from the high frequency resistant coating. The high frequency resistant enamelled wire comprises a metal conductor as a core and a coating layer superimposed on the core. Metal conductors are known in the art and can be selected for special requirements. The metal conductors may be copper. The cross-section of the metal conductors is preferably in a shape of a circle. The diameter of the metal conductor is in a range of 0.1 to 1.5 mm, preferably in a range of 0.20 to 1.0 mm. The high frequency resistant enamelled wire possesses outstanding high frequency resistant properties when the thickness of the coating layer is within a range of 85 to 120 $\mu$m.

Since the coating of the subject invention is thermosetting, the coating layer obtained is superior to the thermoplastic resins in respect of toughness, adhesion, crosslinking density, abrasion resistance, and softening resistance. When the thickness of the coating layer is 90 $\mu$m or more, the high frequency resistant lifetime is comparable to that of JP 56-93214. When the thickness of the coating layer reaches 97 $\mu$m, the high frequency resistant lifetime is three times or more than that of JP 56-93214. Since the coating layer of the subject invention is not applied to the enamelled wire in a multiple coating manner as that of JP 56-93214, the subject invention does not possess adhesion problems. In addition, the subject invention does not involve complicated processes changing processing conditions, and it is inexpensive in cost.

EXAMPLE 1

Preparation of Polyurethane

① Block Diisocyanate Component (produced by polymerization)

Components and their amounts are as follows:

| | |
|---|---|
| dimethyl terephthalate | 194 g (1 mole) |
| trimellitic anhydride | 192 g (1 mole) |
| p,p'-diaminodiphenylmethane | 99 g (0.5 mole) |
| diethylene glycol | 137.8 g (1.3 mole) |
| ethylene glycol | 80.6 g (1.3 mole) |
| glycerin | 34.07 g (0.37 mole) |
| tetrabutyl titanate | 0.7 g |

The above components are mixed in a reactor. The reactor is purged with nitrogen. The contents of the reactor is gradually heated to 230±5° C. The temperature of the contents is maintained for 5 to 8 hours to carry out the dehydration (about 72 to 75 g of water is dehydrated) and the methanol removal until no more water is distilled. Acid value of equal or less than 5 mg KOH/g means that the reaction is finished. Thereafter, the temperature is reduced to 180° C. Cresol (240 g) and xylene (240 g) are added to the reactor to dissolve and dilute the contents.

The solid content of the final product is 55±0.5% (dried at 170° C. for 2 hours).

Viscosity of the product is 200 to 400 poise (30° C.).

② Esterified Polyol Component

Methylene diisocyanate (250 g, 1 mole) and xylene (305 g, 2.5 mole) are mixed in a reactor. The contents of the reactor reaction begins to effect considerable exothermic reaction at 60° C. and is under reaction at 125° C. for about 2 hours. Trimethylolpropane (44.67 g, 0.3 mole) and triethylamine (0.25 g) are added in the reactor at 125° C. and continue reacting for 6 to 8 hours. Thereafter, cresol (47 g) and xylene (47 g) are added in the reactor and the contents are cooled. Nitrogen should be purged into the reactor during the reaction.

The solid content of the final product is 55±0.5% (dried at 170° C. for 2 hours).

Viscosity of the product is 60 to 80 poise (30° C.).

③ Polyurethane

| | |
|---|---|
| esterified polyol component(solid content is 55 ± 0.5%) | 100 g |
| block diisocyanate (solid content is 55 ± 0.5%) | 200 g |
| triethylamine | 0.33 g |
| cresol | 22 g |
| xylene | 22 g |

The above block diisocyanate component ① and esterified polyol component ② are mixed and a homogeneous product ③ is obtained. The solid content of the product is about 43 to 46% (dried at 170° C. for 2 hours). Viscosity of the product is about 23 to 25 poise (30° C.).

EXAMPLE 2

Twisted wire pairs are used to test and evaluate the high frequency-resistant lifetime of the high frequency-resistant enamelled wires of the subject invention by high voltage resistant and high frequency-resistant tester with a voltage up to 622 V (from zero to peak value).

The high frequency resistant enamelled wire of the subject invention is tested and evaluated based on Furukawa standard for general mechanical and electrical properties.

1. Control

TEX-E brand enamelled wire, which is thermoplastic, having a diameter of 1.00 $\mu$m, is used as a control.

2. The Enamelled Wire of the Subject Invention

The enamelled wire of the subject invention, TUEWF 1.00 $\mu$m, is produced from the above-mentioned formulation by means of a conventional coating process.

The results of the comparison is listed below.

TABLE 1

| Item | material | diameter of conductor ($\mu$m) | Overall diameter (mm) | coated thickness (mm) | Pin hole | adhesion | flexibility | B.D.V. (KV) | Solderability | Cut through (° C.) | reciprocal resistance to abrasion (cycles) | high-frequency resistant lifetime (hr) |
|---|---|---|---|---|---|---|---|---|---|---|---|---|
| Furu-Kawa | — | 1.00 ± 0.03 | 1.260↓ | 0.084↑ | 0 | no crack | no carack | 7.0↑ | 400° C. | — | — | 195° C. 622V, 15 KHZ |
| TEX-E | thermo-plastics | 1.008 | 1.216 | 0.104 | 0 | good | good | 15.1 | 420° C. for 6 seconds (residues) | 244° C. | 13 | 116.3 |

TABLE 1-continued

| Item | material | diameter of conductor (μm) | Overall diameter (mm) | coated thickness (mm) | Pin hole | adhesion | flexibility | B.D.V. (KV) | Solderability | Cut through (° C.) | reciprocal resistance to abrasion (cycles) | high-frequency resistant lifetime (hr) |
|---|---|---|---|---|---|---|---|---|---|---|---|---|
| TUEWF | thermo-setting | 0.999 | 1.211 | 0.106 | 0 | good | good | 18.4 | 400° C. for 5 seconds (good) | 246° C. | 134 | 453.1 |
| TUEWF | thermo-setting | 0.998 | 1.212 | 0.107 | 0 | good | good | 18.4 | 400° C. for 5 seconds (good) | 250° C. | 135 | 453.7 |

B.D.V represents breakdown voltage

The result of Table 1 shows that the high frequency resistant lifetime of the subject invention is 337.4 hours more than that of the TEX-E brand 1:00 μm thermoplastic enamelled wire. In other words, the high frequency resistant lifetime of the subject invention is about 3.9 times of that of the TEX-E brand 1.00 μm thermoplastic enamelled wire.

The present invention may, of course, be carried out in other specific ways than those herein set forth without departing from the spirit and essential characteristics of the present invention. The present embodiments are, therefore, to be considered in all respects as an illustration and are not restrictive. Therefore, any changes coming within the meaning and equivalent range of the appended claims are to be embraced therein.

What is claimed is:

1. A high frequency-resistant enamelled wire, comprising a metal conductor as a core and a coating layer superimposed on the core, wherein said coating layer comprises thermosetting polyurethane coating comprising a block diisocyanate component and an esterified polyol component which is produced by mixing said block diisocyanate and said esterified polyol in a ratio of 1:1 to 1:2.5, wherein said block diisocyanate component comprises a diisocyanate, a methylol alkane, and a tertiary amine, wherein the molar ratio between the diisocyanate and methylol alkane is 0.7 to 1.3:0.1 to 0.6, and said esterified polyol component comprises a terephthalate, an anhydride, p,p'-diaminodiphenylmethane, and at least one polyol in a molar ratio of 0.7 to 1.3:0.7 to 1.3:0.3 to 0.7:2 to 4, said coating layer having a thickness sufficient to impart a high frequency resistance to the wire such that it can withstand a carrier frequency of up to 15 kHz and a voltage of up to 622 V for a period of time, said thickness being from 85 to 120 μm.

2. The enamelled wire according to claim 1, wherein said diisocyanate is selected from toluene diisocyanate, methylene diisocyanate, 4,4'-diphenylmethane diisocyanate, hexylene diisocyanate, and xylene diisocyanate.

3. The enamelled wire according to claim 1, wherein said methylol alkane is trimethylol propane, said tertiary amine is triethylamine, said terephthalate is dimethyl terephthalate, and said anhydride is trimellitic anhydride.

4. The enamelled wire according to claim 1, wherein said polyol in said esterified polyol component comprises ethylene glycol, diethylene glycol, and glycerin in a molar ratio of 1.0 to 1.6:1.0 to 1.6:0.2 to 0.5.

5. The enamelled wire according to claim 1, wherein further comprising a single solvent or mixed solvents, wherein the amount of said solvent is 54 to 60% by weight of said coating.

6. The enamelled wire according to claim 1, wherein said coating layer is a single polyurethane layer.

* * * * *